United States Patent [19]

Hooper et al.

[11] 4,344,218
[45] Aug. 17, 1982

[54] CONVEYOR IDLER ROLL ASSEMBLY AND METHOD OF PRODUCING SAME

[75] Inventors: Homer Hooper, Winfield; R. B. Holland, Hodges, both of Ala.

[73] Assignee: Continental Conveyor & Equipment Company, Inc., Winfield, Ala.

[21] Appl. No.: 189,100

[22] Filed: Sep. 22, 1980

Related U.S. Application Data

[63] Continuation of Ser. No. 45,195, Jun. 4, 1979, abandoned.

[51] Int. Cl.³ .............................................. B65G 39/10
[52] U.S. Cl. .............................. 29/516; 29/148.4 D; 193/37; 198/842
[58] Field of Search ............. 198/842, 780, 835; 193/37; 29/516, 148.4 D, 110, 129; 368/20

[56] References Cited

U.S. PATENT DOCUMENTS

| 833,326 | 10/1906 | Hiler | 193/37 X |
| 1,158,901 | 11/1915 | Dobson | 193/37 X |
| 1,366,966 | 2/1921 | Spear | 193/37 X |

Primary Examiner—Robert B. Reeves
Assistant Examiner—Douglas D. Watts
Attorney, Agent, or Firm—Joseph Januszkiewicz

[57] ABSTRACT

An idler roll cylinder is secured to roll heads mounted within the ends thereof by forming an annular, outwardly opening groove in and around the outer periphery of each roll head facing the inner surface of the roll cylinder. A forming pressure is applied adjacent each end of the roll cylinder to form an inwardly extending annular lock member which is pressed into the annular groove. Angularly spaced, outwardly opening recesses are provided in the outer periphery of each roll head facing the inner surface of the roll cylinder and receive inwardly projecting lock elements formed in the roll cylinder by the forming pressure applied thereto.

1 Claim, 6 Drawing Figures

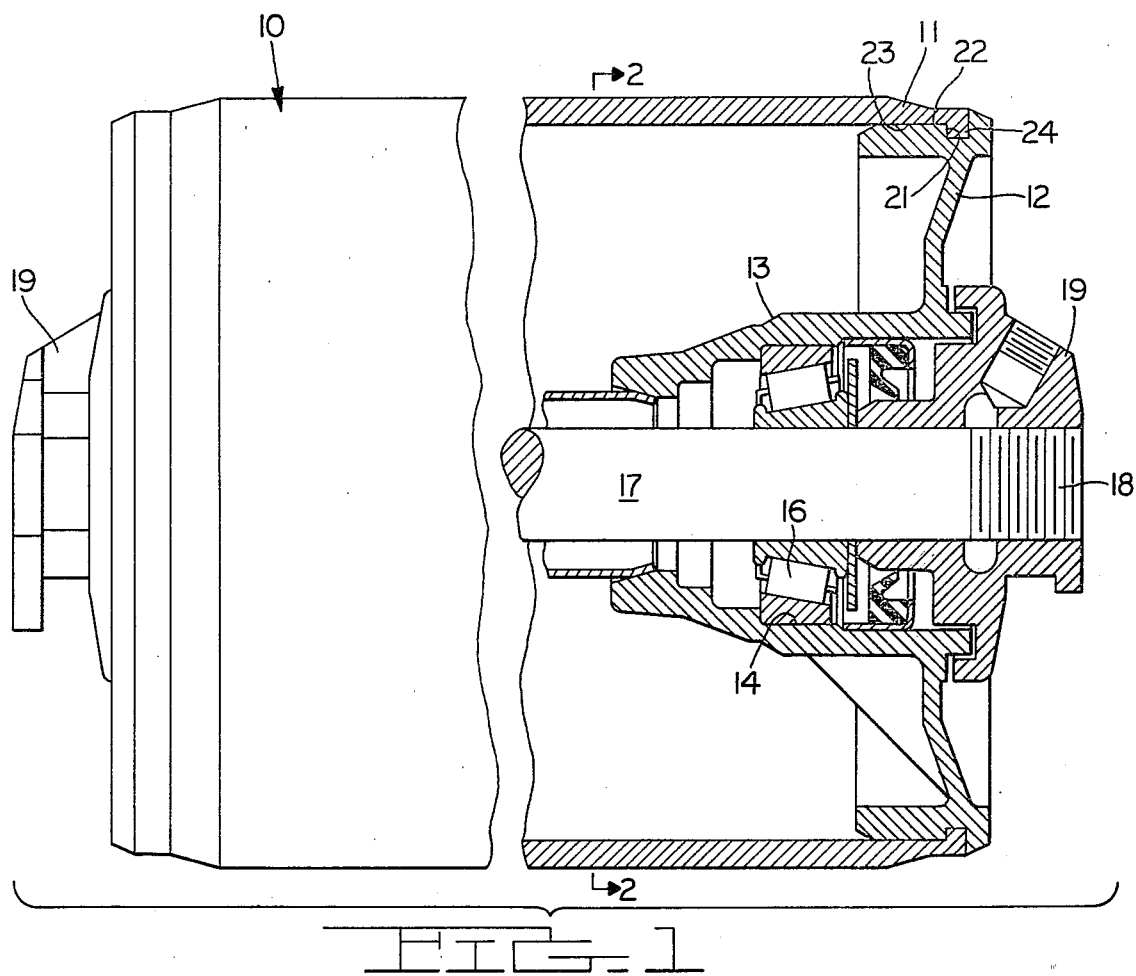
FIG-1
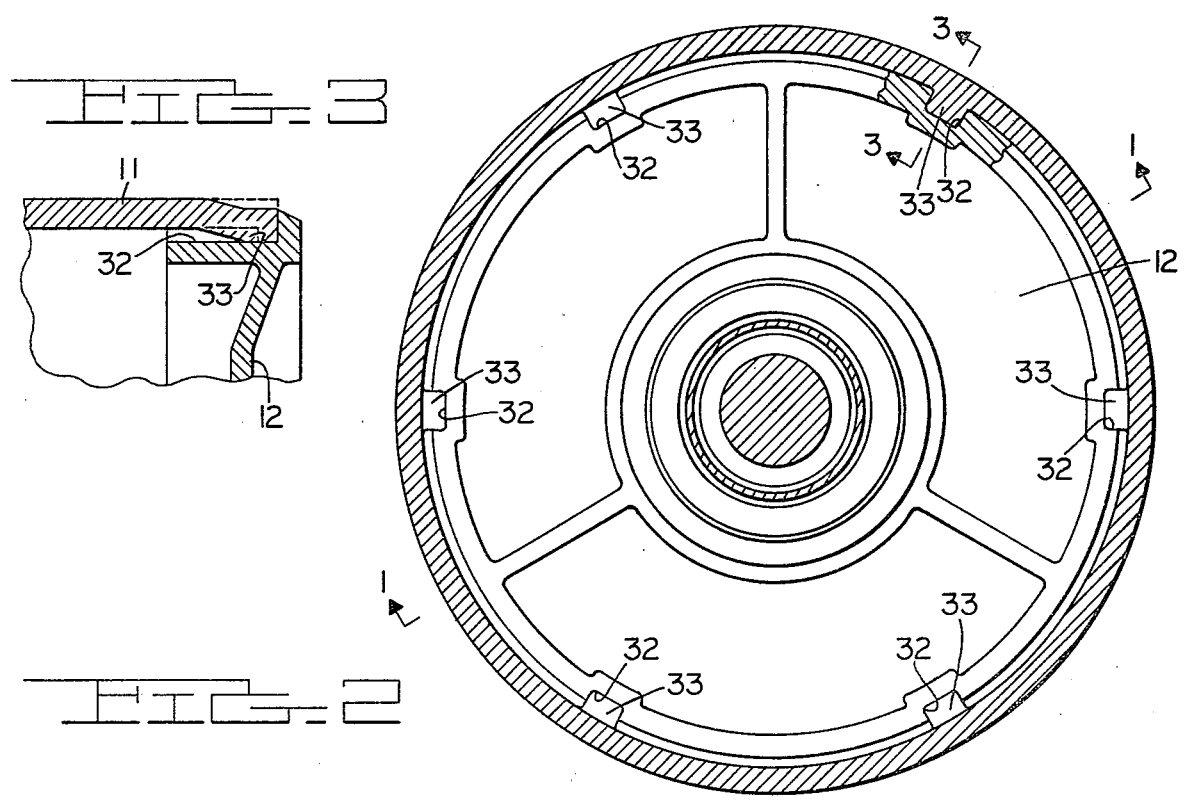
FIG-3
FIG-2

CONVEYOR IDLER ROLL ASSEMBLY AND METHOD OF PRODUCING SAME

This is a continuation of application Ser. No. 045,195, filed June 4, 1979, now abandoned.

BACKGROUND OF THE INVENTION

This invention relates to an idler roll assembly for a conveyor belt and the method of producing the same and more particularly to improved means for securing an idler roll cylinder to roll heads mounted within the ends of the roll cylinder.

Heretofore in the art to which our invention relates, difficulties have been encountered in securing an idler roll cylinder to the roll heads mounted within the ends thereof due to the fact that the roll heads often become separated from the roll cylinder whereby the heads move axially to thus move deeper into the roll cylinder or move outwardly thereof. Also, with most prior art roll assemblies, the head has a tendency to rotate relative to the roll cylinder whereby the head spins or turns inside the roll cylinder to thus further increase wear therebetween.

One method heretofore employed to secure the roll heads to the roll cylinder has been to braze or weld the roll head to the roll cylinder, as shown in the Deems et al. U.S. Pat. No. 2,285,647 and the Kindig U.S. Pat. No. 2,702,868. With the brazed or welded type, the joint between the heads and the roll cylinder often does not extend the entire 360° around the roll due to the fact that you only obtain a good braze joint where the flux has been properly applied. Furthermore, if the heads are not properly brazed to the cylinder, paint or water can leak through into inside of the roll assembly. Another difficulty with providing a brazed joint between the heads and the roll cylinder is that flux is left on the end of the brazed rolls, thus resulting in a rough appearance.

Another difficulty encountered with some prior art roll assemblies is the fact that the ends of the roll are not smooth but are provided with relatively sharp edges which often cut the conveyor belt or greatly increase the wear thereof. This type roll assembly is shown in the Brown U.S. Pat. No. 3,198,318.

With another type of prior art roll assembly, the roll cylinder is profiled or machined whereby it corresponds to the outer surface of the roll head inserted therein. Such a roll cylinder is shown in U.S. Pat. No. 3,774,282. Since the roll cylinder is profiled or machined it is thinner along the area of contact with the roll head. With such rolls, the thinner area often wears through, thus causing separation of the head from the roll cylinder and at the same time causing damage to the conveyor belt. Still another problem encountered with machining or profiling the inside diameter of the roll cylinder is that poor concentricity of the outer surface of the roll cylinder and the center line of the bearings is often obtained. That is, where the inside diameter of the roll cylinder is profiled, the concentricity of the roll cylinder varies as much as the diameter of the roll cylinder varies.

BRIEF SUMMARY OF THE INVENTION

In accordance with our invention, we overcome the above and other difficulties by forming an annular, outwardly opening groove in and around the outer periphery of the roll head which faces the inner surface of the roll cylinder. A forming pressure is applied adjacent the end of the roll cylinder to form an inwardly extending annular lock member which is pressed into the annular groove, thus providing a continuous, 360° lock between the roll heads and the roll cylinder. Angularly spaced outwardly opening recesses are also provided in the periphery of the roll head facing the inner surface of the roll cylinder for receiving inwardly projecting lock elements which are also formed in the roll cylinder by the forming pressure applied thereto.

An object of our invention is to provide an improved, positive lock between the roll heads and the roll cylinder which limits axial movement of the heads in either direction, and at the same time, limits relative rotation between the roll cylinder and the roll heads.

Another object of our invention is to provide a roll assembly of the character designated in which the roll cylinder is provided with smoother end portions which prevent cutting or wear to the conveyor belt and at the same time the appearance of the roll is greatly improved.

A still further object of our invention is to provide a idler roll assembly of the character designated in which improved concentricity is obtained between the outer surface of the roll cylinder and the axial center line of the supporting bearings.

BRIEF DESCRIPTION OF THE DRAWINGS

Idler roll assemblies and apparatus which may be employed to carry out our process are shown in the accompanying drawings, forming a part of this application, in which:

FIG. 1 is a side elevational view, partly broken away and in section, with the part shown in section being taken generally along the line 1—1 of FIG. 2;

FIG. 2 is a sectional view taken generally along the line 2—2 of FIG. 1;

FIG. 3 is a fragmental, sectional view taken generally along the line 3—3 of FIG. 2;

DETAILED DESCRIPTION

Figure 4:
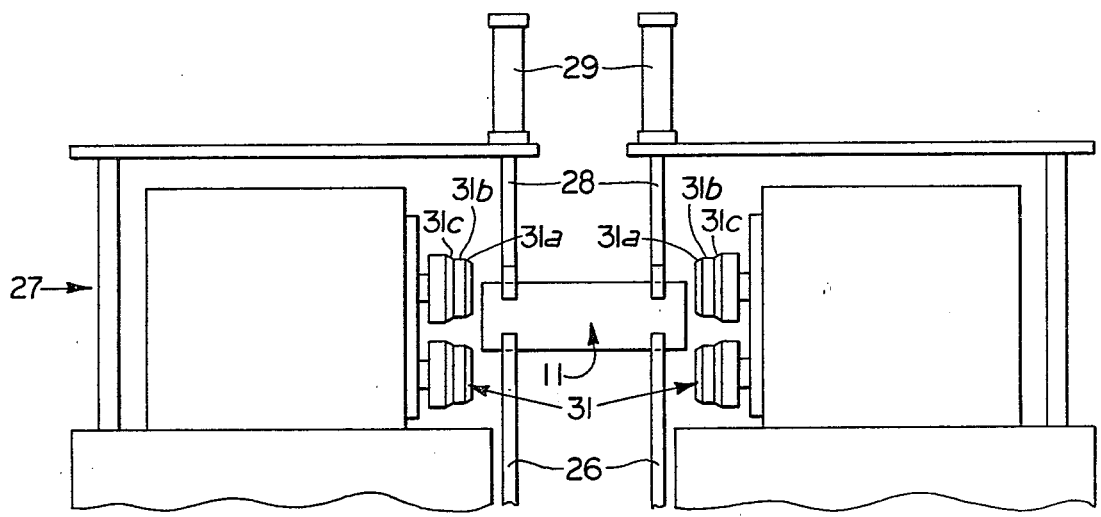
FIG. 4 is a side elevational view showing one form of apparatus which may be employed to apply a forming pressure to the outer surface of the roll cylinder adjacent the ends thereof with the forming members being shown in the inoperative position.

Referring now to the drawings for a better understanding of our invention, we show an idler roll 10 which is adapted for use with an idler roll assembly for supporting a belt conveyor in a conventional manner. The idler roll comprises a roll cylinder 11 having a roll head 12 mounted within each end thereof, as shown. Each head 12 is provided with an inwardly extending hub portion 13 which defines a bearing recess 14 for receiving bearing units indicated generally at 16. The idler roll 10 is thus supported by the bearing units 16 which are interposed between a supporting shaft 17 and the bearing recesses 14 in a manner well understood in the art to which our invention relates. As shown in FIG. 1, the shaft 17 extends through the roll 10 and is provided with a threaded end portion 18 for receiving internal threads of a supporting nut 19 in a conventional manner.

To secure the roll cylinder 11 to the roll heads 12, we form an annular, outwardly opening groove 21 in and around the outer periphery 22 of each roll head 12 in position to face the inner surface 23 of the roll cylinder 11 at the end thereof, as shown in FIGS. 1 and 3. With the annular grooves 21 thus provided in the outer periphery of the heads 12, the heads 12 are positioned within the roll cylinder 11 with the grooves 21 being inwardly of the outer ends of the roll heads, as shown. It will be understood that at the time the roll cylinder 11 is positioned over the roll heads 12, it is in the form of a section of a cylinder which is cut the desired length. That is, it is not necessary to machine or profile the inner surface of the roll cylinder 11 adjacent the end thereof to accommodate the roll head 12. Accordingly, at the time the roll cylinder 11 receives the roll head 12, the wall of the roll cylinder is of a full thickness from one end of the roll cylinder to the other. That is to say, to provide the roll cylinders 11, one merely takes a length of tubular stock and then cuts the same into sections of the desired lengths.

Figure 5:
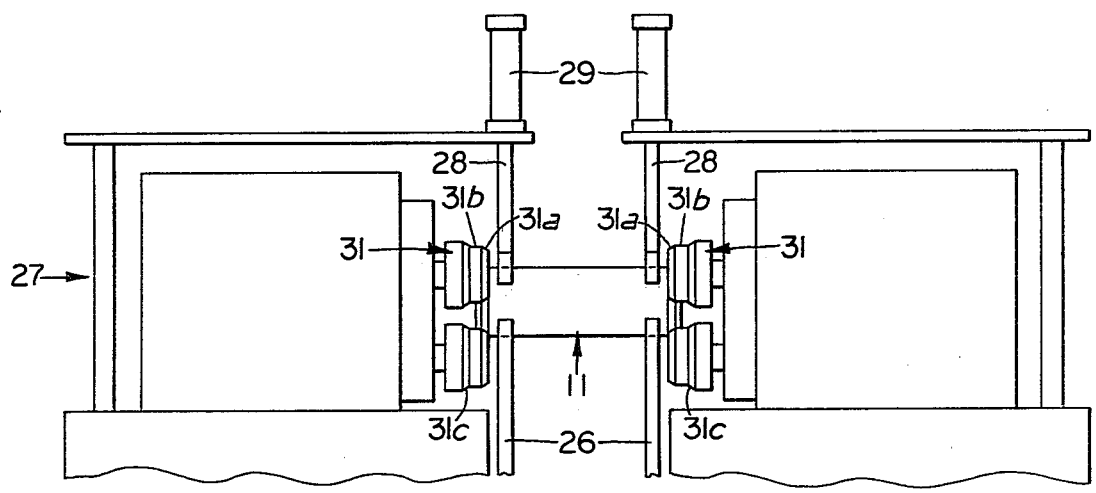
FIG. 5 is an elevational view corresponding to FIG. 4 but showing the forming members in the operative position to apply a forming pressure to the ends of the roll cylinder.
Figure 6:
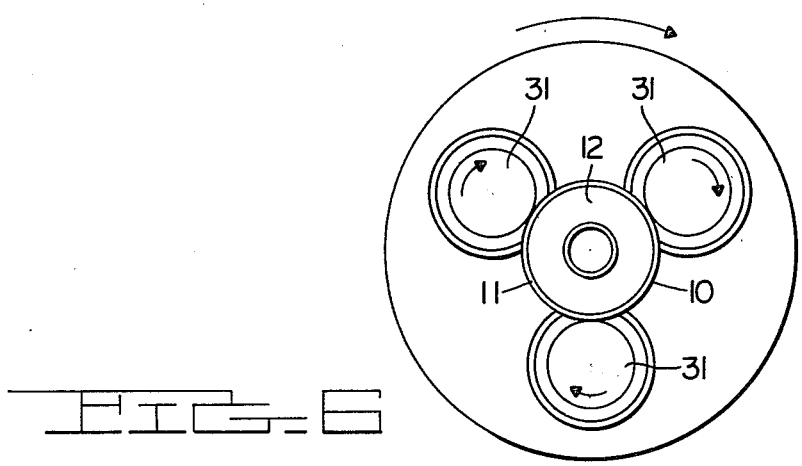
FIG. 6 is a diagrammatic view illustrating the relative positions of the forming members relative to the roll assembly.

With the heads 12 positioned in the ends of the cylindrical shell 11 and the ends of the heads extending beyond the ends of the shell, as shown in FIG. 3, a forming pressure is applied to the outer surface of the roll cylinder 11 adjacent each end thereof to form an inwardly extending, annular lock member 24 at the end of the shell 11 which is rolled or forced into the annular groove 21 with a press fit, as shown in FIG. 1. In FIG. 4 we show the roll cylinder 11 as being supported by stationary rails 26 of a forming machine indicated generally at 27. The roll cylinder 11 is held down by clamp sections 28 which are carried by fluid pressure operated units 29. The forming machine 27 is provided with suitable forming rollers 31. These rollers are mounted on a spinning head and are contoured so that there is an entrance angle 31a, a straight section 31b and a contoured step 31c set to force the end of the tube into the annular groove. In FIG. 4 the forming rollers 31 are shown in the outer, inoperative position while FIG. 5 shows the forming rollers 31 as being in the inner, operative position whereby a forming pressure is applied to the outer surface of the roll cylinder 11 adjacent each end thereof. In view of the fact that the forming apparatus 27 may be of a conventional type, well known in the art to which our invention relates, no further description thereof is deemed necessary.

As shown in FIGS. 2 and 3, angularly spaced, outwardly opening recesses 32 are formed in the outer periphery 22 of each roll head 12 in position to face the inner surface of the roll cylinder 11. Accordingly, by applying a forming pressure, by forming rollers 31, to the outer surface of the roll cylinder 11, the end of the roll cylinder 11 is moved inwardly from the dotted line position shown in FIG. 3 to the solid line position to thus form inwardly projecting locking elements 33 which are pressed into each of the recesses 32 to limit relative rotation between the roll cylinder 11 and its roll head 12. It will thus be seen that the inwardly projecting locking elements 33 are formed concomitantly with formation of the inwardly extending annular lock member 24 as the forming rollers 31 form the end of the roll cylinder 11 to the solid line position shown in FIG. 3. As shown in FIGS. 2 and 3, the angularly spaced, outwardly opening recesses 32 extend laterally of the annular outwardly opening groove 21. That is, the angularly spaced, outwardly opening recesses 32 extend generally perpendicular to the annular, outwardly opening groove 24.

From the foregoing, it will be seen that we have devised an improved conveyor idler roll assembly and method of producing the same. By providing the annular, outwardly opening groove 21 and the angularly spaced, outwardly opening recesses 32 in the outer periphery of the roll head 12, relative axial movement between the roll cylinder and the roll heads is limited and at the same time relative rotary movement between the roll cylinder and the roll head is limited. Accordingly, the roll head remains at a fixed position within the end of the roll cylinder and cannot move deeper into the roll cylinder or move outwardly thereof and at the same time there is no rotation of the head within the roll cylinder. By providing the annular, outwardly opening groove 21 and applying a forming pressure to the outer surface of the roll cylinder adjacent each end to form the inwardly extending annular lock member 24, we provide smoother ends for the roll cylinder and at the same time eliminate all rough or sharp edges which could cut or cause wear to the conveyor belt. Also, by forming the ends of the roll cylinder in accordance with our invention, the appearance of the roll assembly is greatly improved and at the same time production cost is reduced. Also, by eliminating the necessity of profiling or machining the inner surface of the roll cylinder, the roll cylinder is full thickness from one end to the other, thus eliminating thin end areas which often result in separation of the head from the roll shell and damage to the belt conveyor. Furthermore, by providing the annular, outwardly opening groove 21 and the angularly spaced, outwardly opening recesses 32 in the rigid head casting rather than in the roll cylinder, better concentricity of the roll cylinder outer diameter and the axial center line of the supporting bearings is obtained. That is, the outer periphery 22 of the roll head 12 can be turned at the same time the bearing recess 14 is turned, thus making it possible to use commercial tubing without profiling or machining the inner surface of the roll cylinder.

While we have shown our invention in but one form, it will be obvious to those skilled in the art that it is not so limited, but is susceptible of various changes and modifications without departing from the spirit thereof.

What we claim is:

1. A method for securing an idler roll cylinder of an idler roll assembly for a conveyor to a pair of laterally spaced roll heads mounted within the respective ends of said roll cylinders comprising the steps of:
    (a) forming a circumferentially extending outwardly opening groove in and around the outer periphery of each said roll head axially inward of the outer end thereof and facing the end of said roll cylinder adjacent thereto,
    (b) forming a plurality of circumferentially spaced, outwardly opening recesses in the outer periphery of each said roll head facing the inner surface of said roll cylinder and extending laterally of said circumferentially extending outwardly opening groove, and
    (c) spin forming the outer end portions of said roll cylinder adjacent each end thereof to form concomitantly inwardly projecting abutments as lock elements which are pressed into said circumferentially spaced recesses and an integral inwardly extending, annular abutment as a lock member at each end thereof which is forced into the confines of said groove with the outer ends of said roll cylinder terminating axially inward of the outer ends of said roll heads and defining smooth contoured ends for said roll heads with the outer surfaces of said roll heads extending beyond the ends of said roll cylinder.

* * * * *